United States Patent
Danois et al.

(10) Patent No.: US 9,332,297 B2
(45) Date of Patent: May 3, 2016

(54) SECURITY PROCESSOR AND RECORDING METHOD AND MEDIUM FOR CONFIGURING THE BEHAVIOUR OF THIS PROCESSOR

(75) Inventors: Pascal Danois, Saint Cloud (FR); Olivier Granet, Paris (FR); Sébastien Le Henaff, Fontenay le Fleury (FR)

(73) Assignee: VIACCESS, Paris la Defense (FR)

( * ) Notice: Subject to any disclaimer, the term of this patent is extended or adjusted under 35 U.S.C. 154(b) by 1583 days.

(21) Appl. No.: 12/438,061

(22) PCT Filed: Aug. 29, 2007

(86) PCT No.: PCT/FR2007/001411
§ 371 (c)(1),
(2), (4) Date: Feb. 19, 2009

(87) PCT Pub. No.: WO2008/025900
PCT Pub. Date: Mar. 6, 2008

(65) Prior Publication Data
US 2010/0169664 A1    Jul. 1, 2010

(30) Foreign Application Priority Data
Aug. 30, 2006  (FR) ..................................... 06 07631

(51) Int. Cl.
| | | |
|---|---|---|
| *H04N 7/167* | (2011.01) | |
| *H04N 21/418* | (2011.01) | |
| *G06F 21/72* | (2013.01) | |
| *H04L 29/06* | (2006.01) | |
| *H04N 7/16* | (2011.01) | |
| *H04N 21/266* | (2011.01) | |
| *H04N 21/4623* | (2011.01) | |

(52) U.S. Cl.
CPC ............ *H04N 21/4181* (2013.01); *G06F 21/72* (2013.01); *H04L 63/0428* (2013.01); *H04L 63/10* (2013.01); *H04N 7/163* (2013.01); *H04N 21/26606* (2013.01); *H04N 21/4183* (2013.01); *H04N 21/4623* (2013.01)

(58) Field of Classification Search
CPC .......... H04N 21/4181; H04N 21/4183; H04N 21/4623; H04N 21/26606
See application file for complete search history.

(56) References Cited

U.S. PATENT DOCUMENTS

| | | | | |
|---|---|---|---|---|
| 5,892,900 A | * | 4/1999 | Ginter et al. ..................... | 726/26 |
| 6,199,094 B1 | * | 3/2001 | Presler-Marshall .......... | 718/104 |

(Continued)

FOREIGN PATENT DOCUMENTS

WO    WO 03/075233    9/2003

*Primary Examiner* — Steven Kim
(74) *Attorney, Agent, or Firm* — Nicholas B. Trenkle; Stites & Harbison, PLLC

(57) ABSTRACT

Security processor (42) for a decoder able to receive a scrambled multimedia signal, this processor comprising: —at least one first rewritable lock (FIELDKEY, FIELDPIEMM, FIELDPIEMMC, FIELDPIECM, FIELDFCT) whose value can be toggled between a first and a second predetermined value in response to an EMM or ECM message, —a restriction function able to authorize and, alternately, prohibit, as a function of the value of the first lock, only one particular operation of the security processor, this particular operation being chosen from the group composed of: the use of a cryptographic key, the processing of a parameter contained in an EMM or ECM message received, and the execution of an elementary conditional access function of the code of the application.

13 Claims, 3 Drawing Sheets

(56) References Cited

U.S. PATENT DOCUMENTS

| | | | | |
|---|---|---|---|---|
| 6,721,889 | B1* | 4/2004 | Jaegtnes et al. ................. | 726/34 |
| 7,552,457 | B2* | 6/2009 | Van De Ven et al. .. | H04N 7/163 |
| | | | | 380/210 |
| 7,934,083 | B2* | 4/2011 | Taylor .................... | G06F 21/10 |
| | | | | 348/725 |
| 8,520,850 | B2* | 8/2013 | Helms ................ | H04L 63/0428 |
| | | | | 380/201 |
| 8,528,106 | B2* | 9/2013 | Beun .................. | G06F 21/6218 |
| | | | | 726/29 |
| 8,949,623 | B2* | 2/2015 | Becq ..................... | H04N 7/163 |
| | | | | 713/193 |
| 2004/0019789 | A1* | 1/2004 | Buer ............................ | 713/170 |
| 2004/0064689 | A1* | 4/2004 | Carr ............................. | 713/154 |
| 2005/0055551 | A1* | 3/2005 | Becker ................ | H04N 5/4401 |
| | | | | 713/171 |
| 2005/0108563 | A1* | 5/2005 | Becker ................... | H04N 7/163 |
| | | | | 726/14 |
| 2005/0236475 | A1 | 10/2005 | Becker et al. | |
| 2006/0059508 | A1 | 3/2006 | Kamperman et al. | |
| 2006/0075098 | A1* | 4/2006 | Becker ................... | H04L 63/08 |
| | | | | 709/225 |
| 2006/0156033 | A1 | 7/2006 | Desmicht et al. | |
| 2006/0265733 | A1* | 11/2006 | Chen ...................... | G06F 21/71 |
| | | | | 726/1 |
| 2007/0294745 | A1* | 12/2007 | Tan ........................ | G06F 21/74 |
| | | | | 726/2 |
| 2008/0016355 | A1* | 1/2008 | Beun ..................... | H04N 7/167 |
| | | | | 713/172 |
| 2010/0088515 | A1* | 4/2010 | Nishimoto ........... | H04N 7/1675 |
| | | | | 713/168 |

\* cited by examiner

SECURITY PROCESSOR AND RECORDING METHOD AND MEDIUM FOR CONFIGURING THE BEHAVIOUR OF THIS PROCESSOR

The invention relates to a security processor, a method and a recording medium for configuring the behaviour of this processor.

FIELD OF THE INVENTION

Background of the Invention

There exist security processors for a decoder suitable for receiving multimedia signals scrambled with the aid of a control word. These processors such as a chip card that can be plugged into the decoder, a hardware module integrated into the decoder or a software module executing in the decoder, comprise in particular a non-rewriteable memory, this memory containing an application code which, when it is executed by microprocessor, makes it possible to execute a set of operations necessary for processing the conditional access messages sent by a transmitter of an operator so as to extract therefrom the control word necessary for descrambling the scrambled multimedia signal.

There exist several types of conditional access messages, such as ECM messages (Entitlement Control Messages) or EMM messages (Entitlement Management Messages), other types being definable. Variants are possible: there exist EMM messages whose content is not encrypted, here called "non-confidential EMM messages", and confidential EMM messages whose content is encrypted, here called EMMC messages (Entitlement Management Message Confidential). In the subsequent description and in the set of claims, unless indicated to the contrary, the term "EMM" designates both a non-confidential EMM message and an EMMC message.

It is sometimes desirable to modify the behaviour of the security processor. This is desirable in particular when a hacker has found a security flaw in the application code and exploits this flaw fraudulently to obtain the right to descramble the multimedia signal.

In this sense, the patent application published under number WO-03 075233 teaches the making of openings in the application code so as to permit the branching of a portion for substituting codes called "PATCH". For example, the "PATCH" is executed by the microprocessor instead of a portion of the application code exhibiting a security flaw. These "PATCHES" therefore make it possible to modify the behaviour of the security processor.

These "PATCHES" are recorded in a rewriteable non-volatile memory. Thus it is possible to replace a "PATCH" with another "PATCH". This possibility is potentially dangerous since it could be exploited by a hacker to implement in the rewriteable non-volatile memory of the security processor, a hacker patch allowing him, for example, to fraudulently permit the deciphering of the control word.

BRIEF SUMMARY OF THE INVENTION

The invention aims to solve this problem.
The subject of the invention is therefore a security processor wherein:
the security processor comprises at least one first rewriteable lock whose value can toggle between a first and a second predetermined value in response to an EMM message,
the application code also contains a restriction function able to permit and, alternately, to prohibit, in response to the receipt of one and the same ECM or EMM message and as a function of the value of the first lock, only a particular operation of the security processor from the set of operations necessary for processing ECM and EMM messages, while allowing the security processor to execute the other operations that are necessary for processing the EMM and ECM messages and that have not been prohibited, this particular operation being chosen from the group made up of:
the use of a cryptographic key recorded in a memory of the security processor,
the processing of a parameter contained in an EMM or ECM message received, and
the execution of an elementary conditional access function for the application code, each elementary conditional access function for the application code being executed independently of the other elementary conditional access functions so that the non-execution of an elementary conditional access function does not prevent the execution, by the microprocessor, of any one of the other elementary conditional access functions.

The behaviour of the above security processor, in response to one and the same EMM or ECM message, may be modified by toggling the value of the first lock between its first value and its second value. To modify the behaviour of this security processor, it is therefore not necessary to implement portions of code of the application in a rewriteable memory, thus rendering this security processor more safe. Neither is it necessary to modify the ECM or EMM messages broadcast by the network head. At the very most, it is necessary to make provision to dispatch an EMM message containing a new parameter in response to which the lock toggles between the first and the second value.

It will also be noted that this security processor exhibits at least one of the following advantages:
prohibiting the use of a cryptographic key makes it possible to prevent the execution of an elementary conditional access function when the latter uses a particular cryptographic key without, however, preventing the execution of the same function when the latter uses another cryptographic key thereby increasing the possibilities of adjusting the behaviour of the security processor in relation to cryptographic keys,
prohibiting the processing of a parameter of an EMM or ECM message prevents the execution of an elementary conditional access function which ought to have been triggered in response to the receipt of this parameter without, however, preventing the triggering of the execution of the same elementary conditional access function to process another parameter received, thereby making it possible to increase the possibilities of adjusting the behaviour of the security processor in relation to the parameters contained in the EMM and ECM messages,
the prohibiting of an elementary conditional access function makes it possible to definitively or temporarily deactivate an elementary conditional access function exhibiting a security flaw, this possibly being used to render the behaviour of the security processor more safe.

The embodiments of this security processor may comprise one or more of the following characteristics:
the memory comprises at least one field FIELDKEY associated with one of the cryptographic keys, this field FIELDKEY containing several locks, these locks each corresponding to a respective elementary conditional access function, and the restriction function is able to permit and, alternately, to prohibit the use of this cryptographic key by an elementary conditional access function as a function of the value of the lock contained in the field FIELDKEY and corresponding to this elementary conditional access function;

the security processor contains at least one list chosen from the following lists:

a list FIELDPIEMM associated with the non-confidential EMM messages, this list FIELDPIEMM containing several locks, these locks each corresponding to a respective parameter $P_i$ capable of being contained in a non-confidential EMM message, a list FIELDPIEMMC associated with the confidential EMM messages (Entitlement Management Message Confidential) this list FIELDPIEMMC containing several locks, these locks each corresponding to a respective parameter $P_i$ capable of being contained in a confidential EMM message, and a list FIELDPIECM associated with the ECM messages, this list FIELDPIECM containing several locks, these locks each corresponding to a respective parameter $P_i$ capable of being contained in an ECM message, and the restriction function is able to permit and, alternately, to prohibit the processing of a parameter $P_i$ containing a message received by the security processor as a function of the value of the lock corresponding to this parameter in the list associated with this message;

the security processor comprises a list FIELDFCT associated with the elementary conditional access functions, this list FIELDFCT containing several locks, these locks each corresponding to a respective elementary conditional access function, and the restriction function is able to permit and, alternately, to prohibit the execution of an elementary conditional access function as a function of the value of the lock of the list FIELDFCT corresponding to this elementary conditional access function;

the security processor comprises at least one second rewriteable lock whose value can toggle between a first and a second predetermined value in response to an EMM message, the restriction function is able to permit or alternately to prohibit as a function of the value of this second lock:

the use of any cryptographic key necessary for toggling the value of the first or of the second lock, the processing of any parameter contained in an EMM message suitable for toggling the value of the first or second lock, and the execution of any elementary conditional access function suitable for toggling the value of the first or second locks;

the elementary conditional access function is different from a function for writing new access entitlements and a function for writing new cryptographic keys.

These embodiments, moreover, exhibit the following advantages:

the use of a field FIELDKEY makes it possible to render the security processor more safe since it makes it possible to render a cryptographic key unusable by certain elementary functions exhibiting a security flaw while retaining the possibility of using this same cryptographic key for other elementary functions devoid of security flaws, the use of at least one list chosen from the lists FIELDPIEMM, FIELDPIEMMC and FIELDPIECM makes it possible to increase the possibilities of adjusting the behaviour of the security processor by permitting or prohibiting the processing of one and the same parameter as a function of the message in which it is contained; moreover the use of at least the lists FIELDPIEMM and FIELDPIEMMC makes it possible to ensure that a parameter, in order for it to be processed, is in a confidential EMM, this parameter being prohibited in the list FIELDPIEMM and permitted in the list FIELDPIEMMC, the use of the list FIELDFCT makes it possible to adjust the behaviour of the security processor elementary conditional access function by elementary conditional access function, preventing the use of any key or the processing of any parameter of the execution of any function that is capable of modifying the value of the first or second lock makes it possible to freeze definitively the behaviour of the security processor as regards the operations permitted or prohibited by the first lock.

The subject of the invention is also a method for configuring the above security processor in which the method comprises:

the provision of at least one first rewriteable lock whose value can toggle between a first and a second predetermined value in response to an EMM message, the permitting and, alternately, the prohibiting, as a function of the value of the first lock, of only a particular operation of the security processor from the set of operations necessary for processing the ECM and EMM messages, while allowing the security processor to execute the other operations that are necessary for processing the EMM and ECM messages and which have not been prohibited, this particular operation being chosen from the group made up of:

the use of a cryptographic key recorded in a memory of the security processor, the processing of a parameter contained in an EMM or ECM message received, and the execution of an elementary conditional access function by the security processor, each elementary conditional access function being executed independently of the other elementary conditional access functions so that the non-execution of an elementary conditional access function does not prevent the execution, by the security processor, of any one of the other elementary conditional access functions.

The embodiments of this configuring method may comprise one or more of the following characteristics:

the provision of a memory containing at least one field FIELDKEY associated with one of the cryptographic keys, this field FIELDKEY containing several locks, these locks each corresponding to a respective elementary conditional access function, and the permitting and, alternately, the prohibiting of the use of this cryptographic key associated with the field FIELDKEY by an elementary conditional access function as a function of the value of the lock which is contained in the field FIELDKEY and which corresponds to this elementary conditional access function;

the provision of a memory containing at least one list chosen from the following lists:

a list FIELDPIEMM associated with the non-confidential EMM messages, this list FIELDPIEMM containing several locks, these locks each corresponding to a respective parameter $P_i$ capable of being contained in a non-confidential EMM message, a list FIELDPIEMMC associated with the confidential EMM messages (Entitlement Management Message Confidential) this list FIELDPIEMMC containing several locks, these locks each corresponding to a respective parameter $P_i$ capable of being contained in a confidential EMM message, and a list FIELDPIECM associated with the ECM messages, this list FIELDPIECM containing several locks, these locks each corresponding to a respective parameter $P_i$ capable of being contained in an ECM message, and the permitting and, alternately, the prohibiting of the processing of a parameter $P_i$ containing a message received by the security processor as a function of the value of the lock corresponding to this parameter in the list associated with this message;

the provision of a memory comprising a list FIELDFCT associated with the elementary conditional access functions, this list FIELDFCT containing several locks, these locks each corresponding to a respective elementary conditional access function, and the permitting and, alternately, the prohibiting of the execution of an elementary conditional access function as a function of the value of the lock in the list FIELDFCT corresponding to this elementary conditional access function;

the initial configuring by default of the value of each lock so that, in response to the receipt of the first EMM or ECM message broadcast by the network head, no particular operation is prohibited;

the receipt in one and the same EMM message:

of a first parameter triggering the toggling of the value of the first lock so as to permit a particular operation of the security processor, of a second parameter triggering the execution of this same particular operation, and of a third parameter triggering the toggling of the value of the first lock so as to prohibit this same particular operation, and the processing in order by the security processor of the first, second and third parameters;

the elementary conditional access function is different from a function for writing new access entitlements and a function for writing new cryptographic keys.

The embodiments of this configuring method furthermore exhibit the following advantages:

the initial configuring of the value of each lock so as to permit all the operations necessary for processing the ECM and EMM messages, increases the security of the security processor since a hacker may possibly be able to modify the behaviour of the security processor solely to prevent particular operations, and permitting a particular operation and then, immediately after, executing this particular operation and then immediately, after, prohibiting this particular operation makes it possible to prevent a hacker from exploiting a security flaw in this particular operation since the execution of this particular operation is rendered possible only for a very short span of time.

The subject of the invention is also a medium for recording information containing instructions for the execution of the configuring method hereinabove, when these instructions are executed by a microprocessor.

BRIEF DESCRIPTION OF THE DRAWINGS

The invention will be better understood on reading the following description given merely by way of nonlimiting example and by referring to the drawings, in which.

DETAILED DESCRIPTION OF THE INVENTION

Subsequently in this description, the characteristics and functions that are well known to a person skilled in the art are not described in detail.

Figure 1:
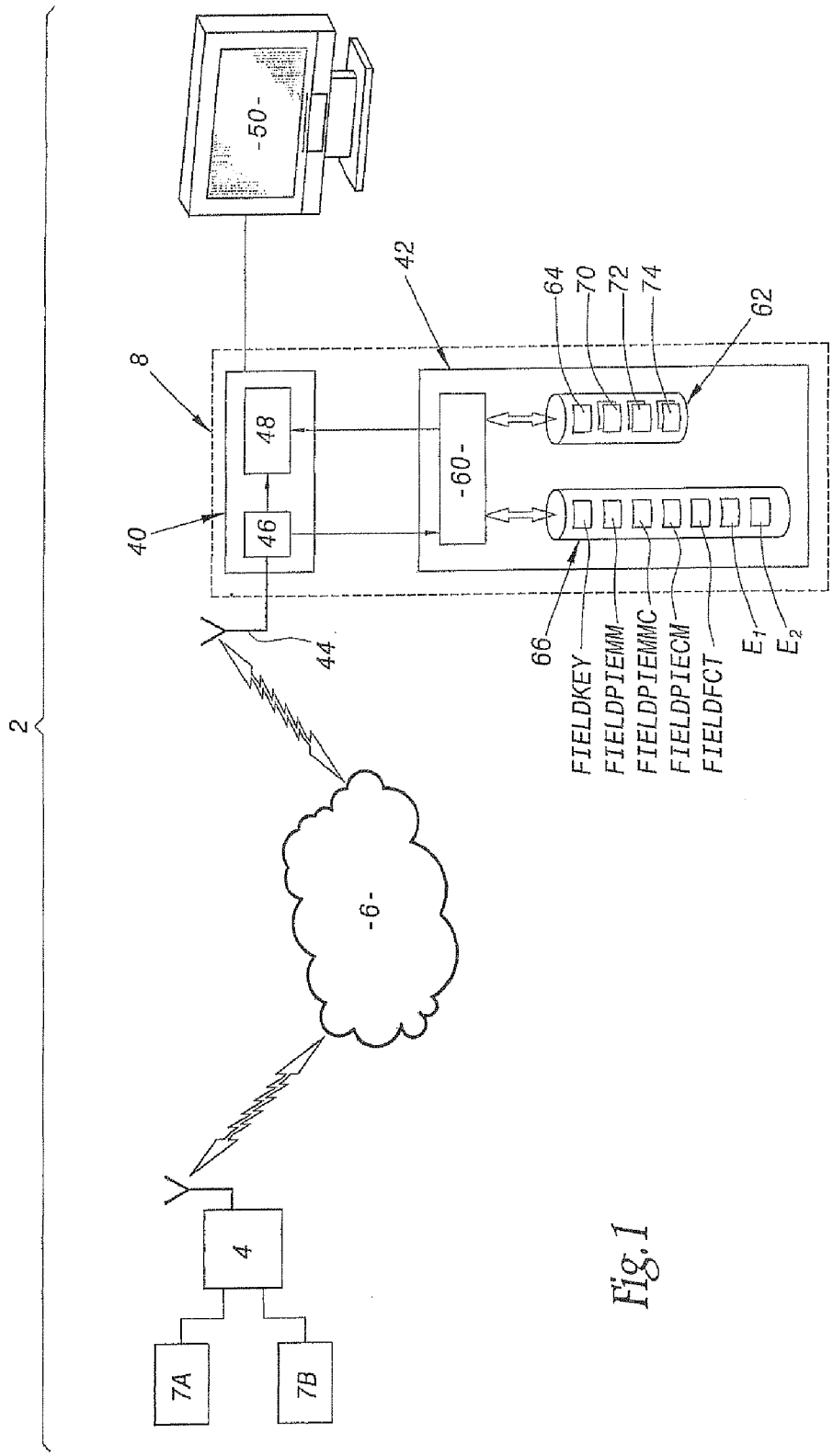
FIG. 1 is a schematic illustration of the architecture of a system for transmitting scrambled multimedia signals.

FIG. 1 represents a system 2 for transmitting scrambled multimedia signals. The multimedia signals are, for example, audiovisual signals corresponding to audiovisual programmes of television channels.

The system 2 comprises a sender 4 of multimedia signals scrambled with the aid of a control word CW bound for a large number of receivers by way of an information transmission network 6. The sender 4 is known by the term "network head".

To simplify FIG. 1, only one receiver 8 is represented.

The network 6 is, for example, an RT network such as is illustrated here or a large-distance cable network.

Here, the multimedia signals are generated by two distinct operators 7A and 7B. More precisely, each operator 7A, 7B generates the plain text multimedia signals, that is to say, unscrambled, and transmits them to the sender 4 which is responsible for scrambling them before broadcasting them by way of the network 6.

Subsequently, in this description, the operators 7A and 7B are, respectively associated with the operator identifiers $SOID_1$ and $SOID_2$.

The sender 4 is able to dispatch ECM messages and EMM messages concomitantly with the scrambled multimedia signals. For example, the scrambled multimedia signals and the ECM and EMM messages are multiplexed in one and the same information packet.

Figure 2:
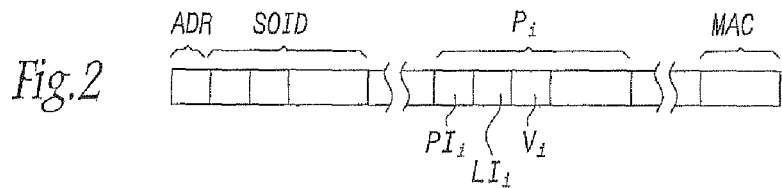
FIGS. 2 and 3 are schematic illustrations of a portion of a frame of an EMM and ECM message.
Figure 3:
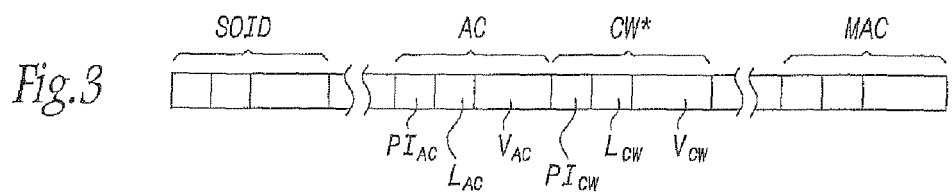

FIGS. 2 and 3 represent examples of frame structure, respectively, of an EMM message and of an ECM message in accordance with UTE standard C90-007.

The frame of the EMM message begins with a field ADR containing an identifier ADR of a particular receiver or of a group of receivers. In the case where the EMM message is addressed to all the receivers of the system 2, the field ADR may be omitted.

Thereafter, the EMM message contains parameters $P_i$ intended for configuring the receivers so that the latter can correctly descramble the multimedia signals for which a subscription has been taken out. Each of these parameters is coded using a TLV (Type Length Value) structure. Under these conditions, each parameter $P_i$ is formed by juxtaposing three fields $PI_i$, $LI_i$ and $V_i$. The field $PI_i$ contains an identifier $PI_i$ of the parameter $P_i$. The field $L_i$ contains a value indicating that it is the length of the field $V_i$. The field $V_i$ contains the value of the parameter $P_i$.

In FIG. 2 a parameter SOID and a parameter MAC systematically present in the EMM messages, have also been represented. The parameter SOID contains the identifier SOID of the operator broadcasting this EMM message.

The parameter MAC (Message Authentification Code) contains a code making it possible to verify the authenticity and integrity of the EMM message.

The wavy vertical lines indicate that only part of the structure of the EMM message is represented in FIG. 2.

In contradistinction to the EMM message, the structure of an ECM message does not contain any ADR field since an ECM message is addressed a priori to all the receivers of the system 2. The ECM message also comprises several parameters coded according to the TLV structure. Typically, the ECM message comprises a parameter SOID and a parameter MAC having the same functionalities as those already described with regard to FIG. 2.

Subsequently, the ECM message comprises a parameter AC and a parameter CW*. The parameter AC contains a multimedia signals access condition. This parameter AC is identified here in the ECM message by an identifier $PI_{AC}$. Its length is defined in a field $L_{AC}$ and its value is contained in a field $V_{AC}$. When access to the multimedia signals depends on several conditions, the ECM message may contain several parameters AC.

The parameter CW* is intended to contain a cryptogram CW* of the control word used to scramble the multimedia signals. This cryptogram CW* is generated by the sender 4 by enciphering the control word CW with the aid of an operating key $K_e$. Here, this parameter CW* is identified by an identifier $PI_{CW}$, whose length is contained in a field $L_{CW}$ and its value is contained in a field $V_{CW}$.

As in FIG. 2, in FIG. 3, the wavy vertical lines indicate that the ECM message may contain other parameters.

The receiver 8 is able to receive the scrambled multimedia signals as well as the ECM and EMM messages. For this purpose, the receiver 8 comprises a decoder or terminal 40 linked to a security processor 42. The processor 42 is, for example, a removable processor such as a chip card which can be inserted into the decoder 40. The processor 42 communicates with the decoder 40 by way of a processor/decoder interface. Typically, the interface is formed of electrical connectors, each connector having a male element and a female element integral either with the decoder or with the processor. The interface between the decoder 40 and the processor 42 is, for example, in accordance with ISO Standard 7816.

The decoder 40 is, here, equipped with an antenna 44 for receiving the various signals broadcast by the sender 4. This antenna 44 is linked to a block 46 for demultiplexing the signals and, possibly for filtering these signals. At the output of this block 46, the scrambled multimedia signals are dispatched to a descrambler 48. The EMM and ECM messages are dispatched, for their part, to the processor 42.

The descrambler 48 is able to descramble the multimedia signals scrambled with the aid of the control word CW deciphered by the processor 42.

The decoder 40 is linked to a device 50 for displaying the descrambled multimedia signals, such as, for example, a television set.

The processor 42 is equipped:
with an electronic microprocessor 60,
with a non-rewriteable and non-volatile memory 62 containing a code 64 of an application which, when executed by the microprocessor 60, makes it possible to process the ECM and EMM messages so as to allow the deciphering of the control word necessary for descrambling the multimedia signals received, and
a non-volatile rewriteable memory 66 such as, for example, an EEPROM memory (Electrically Erasable Programmable Read-only Memory).

The application represented by the code 64 is made up of a set of elementary functionalities characteristic of the processing of conditional access messages. Each of these elementary conditional access functionalities may be executed independently of one another. Thus, the non-execution of an elementary functionality such as this does not prevent the execution, by the microprocessor, of any one of these other elementary functionalities. For simplicity, in what follows, an elementary conditional access functionality such as this will be called an "elementary function".

By way of illustration the memory 62 contains a table 70 making it possible to identify which operations for processing the code should be executed so as to carry out this elementary function.

The array below gives examples of elementary functions. The first and second columns of this array contain for each elementary function, respectively, an identifier of the elementary function and a brief description of the operation carried out by this elementary function.

| Array 1 | |
|---|---|
| IdF1 | Deciphering of a cryptogram CW* with the aid of a key $K_e$ |
| IdF2 | Verifying of the MAC parameter of an ECM message |
| IdF3 | Deciphering of a confidential EMM message |
| IdF4 | Modifying of the permitted ceiling for impulse buying |
| IdF5 | Writing of a new access entitlement |
| IdF6 | Writing or modifying of a cryptographic key $K_e$ after deciphering its cryptogram with the aid of a key $K_s$ |
| IdF7 | Configuring the value of the locks |
| IdF8 | Comparing the access conditions received with the access entitlements contained in the security processor. |

The code 64 also contains a particular elementary function, termed the "restriction function" illustrated as function Idf7 in array 1, which will be described in greater detail with regard to FIG. 1.

The memory 62 also contains a table 72 comprising the information necessary to determine that elementary function or those elementary functions whose execution must be triggered so as to process the data identified by an identifier $P_i$ received.

The array below gives examples of parameters $P_i$ capable of being contained in an EMM or ECM message. The first column of this array contains the identifier of the parameter $P_i$ and the second column defines this parameter $P_i$ succinctly.

| Array 2 | |
|---|---|
| $PI_{CW}$ | Contains the cryptogram CW* in an ECM message. This cryptogram must be deciphered with a key $K_e$ to obtain the control word CW. |
| $PI_{Ke}$ | Contains the key $K_e$ in an EMM message. This cryptogram must be deciphered by a key $K_s$ before writing or modifying the key $K_e$. |
| $PI_{config}$ | In an EMM message, contains the configuration data for lists FIELDPIEMM, FIELDPIEMCC, FIELDPIECM, FIELDFCT and for fields FIELDKEY |
| $PI_{SOID}$ | Contains the identifier SOID of an operator to identify the cryptographic context of the latter necessary for processing the ECM or EMM message. |
| $PI_{MAC}$ | Contains an MAC code (Message Authentification Code) control of which makes it possible to verify the authenticity and the integrity of the ECM or EMM message |
| $PI_{TdA}$ | Contains data for writing a new access entitlement |
| $PI_{AC}$ | Contains conditions for accessing a multimedia signal to be compared with the access entitlements present in the security processor. |

Finally, the memory 62 also contains a table 74 making it possible to determine the location where a cryptographic key of a given operator is recorded.

Here, for each operator 7A, 7B, the processor 42 contains for example, the keys listed in the following array. The first column of this array contains the name of the key, the second column contains the identifier of this key and the third column contains a brief description of the function of this key.

| Array 3 | | |
|---|---|---|
| $K_e$ | $K_e$-ID | Key for deciphering the cryptogram CW* of a control word CW |
| $K_u$ | $K_u$-ID | Key making it possible to decipher a confidential EMM message |
| $K_s$ | $K_s$-ID | Key for deciphering a cryptogram $K_e$* of the key $K_e$ |

Bearing in mind the notation defined in array 3, table 74 contains the information listed in the array below. The first column of this array contains the identifier of the key, the second column contains the identifier of the operator using this key and the third column contains information through which the processor can find the location of this key in the memory 66.

| Array 4 | | |
|---|---|---|
| $K_e$-ID | $SOID_1$ | @1-$K_e$ |
| $K_e$-ID | $SOID_2$ | @2-$K_e$ |
| $K_u$-ID | $SOID_1$ | @1-$K_u$ |
| $K_u$-ID | $SOID_2$ | @2-$K_u$ |
| $K_s$-ID | $SOID_1$ | @1-$K_s$ |
| $K_s$-ID | $SOID_2$ | @2-$K_s$ |

The memory 66 contains two distinct memory areas, here called entity $E_1$ and entity $E_2$, in which are stored the cryptographic keys used, respectively, by the operators 7A and 7B. Preferably, the access entitlements to the multimedia signals used by the operators 7A and 7B are recorded only in their respective entities $E_1$ and $E_2$.

It will be noted that in the processor 42 the same key, for example, the key $K_e$ is not recorded at the same place depending on whether it is controlled and used by the operator 7A or by the operator 7B. This makes it possible to give this key $K_e$ different values depending on whether it is used by one or other of the operators.

Finally, the memory 66 also contains lists FIELDKEY, FIELDPIEMM, FIELDPIEMMC, FIELDPIECM, and FIELDFCT.

Figure 4:
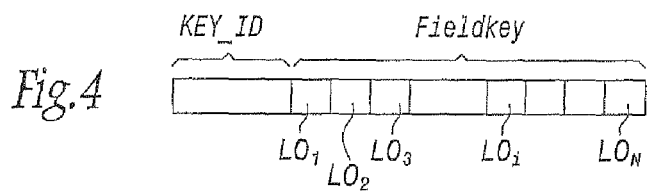
FIGS. 4, 5 and 6 are examples of the structure of data used in the system of FIG. 1.

The list FIELDKEY associates several locks with each cryptographic key. More precisely, as illustrated in FIG. 4, for each key, the list FIELDKEY contains:
  a field KEY-ID containing the key identifier as defined in array 3, and
  a field FIELDKEY containing as many locks $LO_i$ as identifiers of elementary functions involving a key. Here, each lock corresponds to a field intended to contain just one binary value such as "0" or "1". Given that this lock is contained in the memory 66, said lock is rewriteable and its value may be toggled from the value "0" to the value "1" and vice versa.

Here, the locks $LO_i$ are disposed one after the other in contiguous and successive memory areas so that the position of a lock makes it possible to identify the elementary function to which it corresponds. For example, the lock $LO_1$ at the ith position is uniquely associated with a single identifier $IdF_i$ of an elementary function and vice versa.

Here, when a lock $LO_i$ contains the value "0" this signifies that the use of the key identified by KEY-ID by the elementary function corresponding to this lock $LO_i$ is permitted. In the contrary case where the lock $LO_i$ comprises the value "1", the elementary function corresponding to this lock cannot use this cryptographic key.

Figure 5:
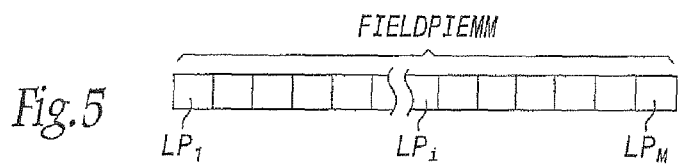

The FIELDPIEMM list illustrated in FIG. 5 contains locks $LP_i$ to indicate, for each parameter $P_i$ capable of being contained in a non-confidential EMM message, whether its processing by the processor 42 is permitted or prohibited. For example, the list FIELDPIEMM contains as many locks $LP_i$ as parameters $P_i$ capable of being received. Just as for the list FIELDKEY, the value of each lock can toggle between the value "0" and the value "1" and vice versa. The list FIELDPIEMM is achieved through a succession of fields each containing a binary value and each corresponding to a lock $LP_i$. The position of the lock $LP_i$ in the list FIELDPIEMM makes it possible to determine which is the unique parameter $P_i$ corresponding to this lock. It will be noted in particular that the list FIELDPIEMM contains a lock $LP_{config}$ corresponding to the parameter $P_{config}$ containing the information necessary for configuring each of the locks. The value "0" of the lock $LP_i$ signifies that the processing of the parameter $P_i$ corresponding to this lock is permitted. The value "1" signifies that the processing of the same parameter $P_i$ is prohibited.

The list FIELDPIEMMC contains locks $LC_i$ to indicate which are the parameters, capable of being contained in an EMMC message (Entitlement Management Message Confidential), which have to be processed by the processor 42. It is recalled that an EMMC message is identical to an EMM message with the exception that part of its parameters is enciphered with the aid of a predefined key Each lock $LC_i$ corresponds to a single parameter $P_i$. The list FIELDPIEMMC also comprises a lock $LC_{config}$ corresponding to the parameter $P_{config}$.

The list FIELDPIECM contains locks $LE_i$ to indicate which are the parameters of an EMC message whose processing is permitted or prohibited by the processor 42. Each lock $LE_i$ corresponds to a single parameter $P_i$.

For example, the structure of the lists FIELDPIEMMC and FIELDPIECM is identical to that described in regard to FIG. 5 with the exception that the locks are denoted $LC_i$ and $LE_i$ respectively. The significance of the values "0" and "1" for these locks $LC_i$ and $LE_i$ is the same as for the lock $LP_i$.

Figure 6:
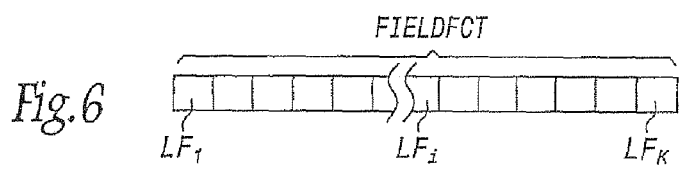

The list FIELDFCT contains locks $LF_i$ able to indicate which are the elementary functions whose execution is permitted or on the contrary, prohibited, inside the processor 42. For example, the structure of this list FIELDFCT represented in FIG. 6 contains as many locks $LF_i$ as elementary function identifiers contained in the array 1 so that each lock corresponds to a single elementary function. It is recalled that here the expression "elementary function" is understood to mean an elementary conditional access functionality. The structure of the list FIELDFCT is similar to the structure described in regard to FIG. 5. Thus, the position of the lock $LF_i$ makes it possible to determine which is the unique identifier $IdF_i$ corresponding to this lock. Here, when the lock $LF_i$ takes the value "0" the execution of the corresponding elementary function is permitted. When the value of the same lock takes the value "1", the execution of the corresponding elementary function is prohibited. In this case, either no function is executed, or a replacement function is automatically executed instead of the prohibited elementary function. The code of this replacement function is contained in the memory 62. Here, the replacement function is systematically designed to be safer than the elementary function that it may optionally replace. For example, the replacement function systematically comprises fewer instructions than the elementary function that it replaces.

Figure 7:
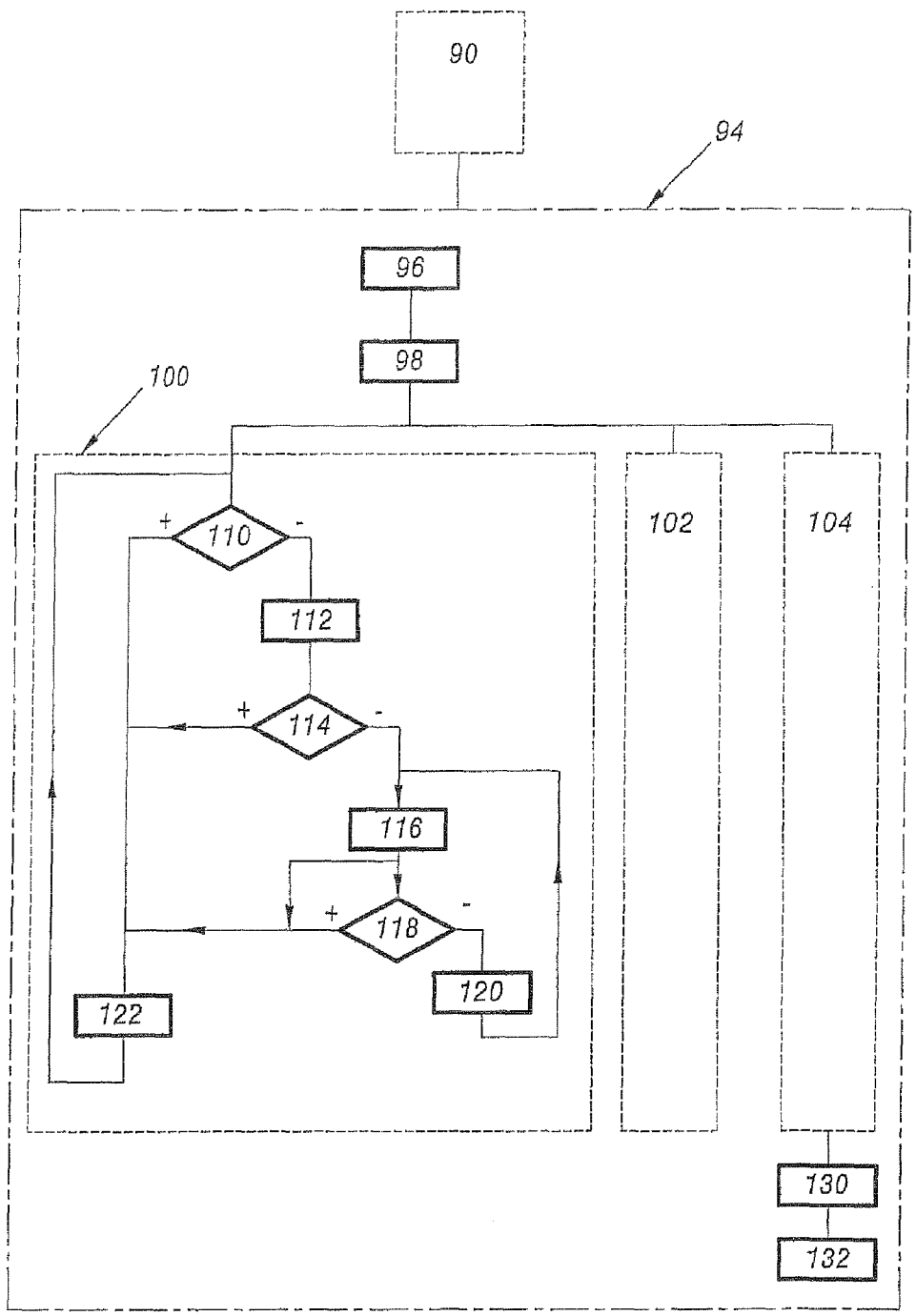
FIG. 7 is a flowchart of a method for configuring the behaviour of a security processor of the system of FIG. 1.

The operation of the system 2 will now be described in regard to the method of FIG. 7.

Initially, during a customization phase 90, the processor 42 is configured by way of a special interface such as, for example, a JTAG interface (Joint Test Action Group) or by way of the same interface as that used to connect it to the decoder 40. The customization phase is conducted in a secure medium and in particular, the various configuration commands transmitted to the processor 42 are never transmitted by way of a WAN network (Wide Area Network). During the phase 90, a configuration unit independent of the sender 4 is used to initialize the value of each of the locks typically to the value "0".

Once the customization phase is complete, the processor 42 is distributed and then inserted into a decoder of a subscriber. A usage phase 94 then begins.

During the phase 94, the processor 42 processes the EMM and ECM messages transmitted by the sender 4 in such a way as to be capable of extracting from these messages the control word CW necessary for descrambling the scrambled multimedia signals received.

Figure 8:
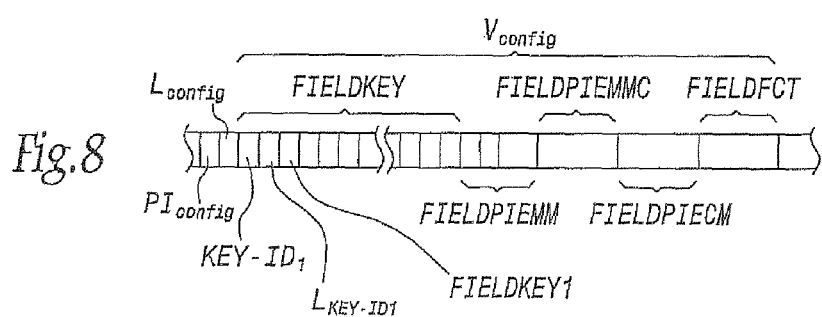
FIG. 8 is a schematic illustration of a portion of a frame of an EMM configuration message.

In the course of the usage phase, during a step 96, an EMM configuration message is transmitted to the processor 42 by the sender 4. This configuration message contains a configuration parameter $P_{config}$. An exemplary structure of this parameter P is represented in FIG. 8. This parameter $P_{config}$ is coded according to the TLV structure. It therefore contains a field containing the identifier $PI_{config}$ indicating that the data which follow are configuration data for the lists FIELDKEY, FIELDPIEMM, FIELDPIEMMC, FIELDPIECM and FIELDFCT. The parameter $P_{config}$ also contains a field $L_{config}$ and a field $V_{config}$. The field $L_{config}$ indicates the length of the field $V_{config}$. The field $V_{config}$ contains all the information necessary for updating the values of the locks of the various lists contained in the memory 66. The various items of information are, for example, here themselves coded using the TLV structure. Thus, the field $V_{config}$ is divided into five portions FIELDKEY, FIELDPIEMM, FIELDPIEMMC, FIELDPIECM and FIELDFCT respectively. Each of these sections respectively contains the information necessary for toggling the value of each of the locks $LO_i$, $LP_i$, $LC_i$, $LE_i$, and $LF_i$.

During a step 98, in response to the receipt of the EMM configuration message, the execution of the function for configuring the values of the various locks is triggered. Thus, during step 98, the value of each of the locks is adjusted as a function of the information contained in the field $V_{config}$.

Thereafter, if the processor 42 receives a non-confidential EMM message or an EMMC message, the processor carries out, respectively, steps 100 and 102 for managing the access rights and cryptographic keys. If the processor 42 receives an ECM message, it then carries out a step 104 of extracting the control word.

At the beginning of step 100, during an operation 110, the microprocessor 60 executes the restriction function to determine whether the processing of the first parameter $P_i$ received is prohibited. To do this, during step 110, the restriction function consults the list FIELDPIEMM and verifies whether the lock corresponding to this parameter $P_i$ has the value "1". If not, during a step 112, the processor 42 identifies which is the elementary function whose execution should be triggered to process the parameter $P_i$. For this purpose, the table 72 is used.

Thereafter, during an operation 114, the microprocessor 60 executes the restriction function once again so as to determine whether the execution of the elementary function identified during step 112 is prohibited. For this purpose, during step 114, the list FIELDFCT is used. More precisely, during the operation 114, the processor 42 verifies whether the value of the lock corresponding to the elementary function identified has the value "1". If not, the execution of this elementary function is permitted and the method continues with an operation 116 of executing this elementary function.

It is assumed here that during the execution of this elementary function, the latter attempts to access a cryptographic key in the entity $E_i$ corresponding to the identifier $SOID_i$ received.

With each attempted access to a cryptographic key, during an operation 118, the microprocessor executes the restriction function to verify whether the elementary function currently executed is, or is not, permitted to use the key which it is attempting to access. For this purpose, during the operation 118, the list FIELDKEY is used. More precisely, during the operation 118, the processor 42 verifies whether the value of the lock associated with the identifier ID-KEY of this key and corresponding to this elementary function is equal to "1". If not, during an operation 120, access to this cryptographic key is permitted and the method returns to the operation 116 where the elementary function continues to execute.

Once the operation 116 is completely executed, or if, during one of the operations 110, 114 or 118, the value of the lock tested is equal to "1", then the method continues with an operation 122 of immediate stoppage of the processing operations triggered by the parameter $P_i$ received. Moreover, in the case where operation 122 is carried out, since the value of one of the locks tested is equal to "1", an error indication may be emitted. In this embodiment, no replacement function is executed if the value of the lock tested is also "1".

After the operation 122, the method returns to operation 110 to process the next parameter $P_i$ contained in the same EMM message.

Steps 110 to 122 are repeated for all the parameters $P_i$ of the EMM message received.

For example, by setting the value of the locks $LO_i$, $LP_i$ and $LF_i$, it is possible to obtain the following behaviours of the security processor:

the parameter $P_{Ke}$ containing the cryptogram of a new key $K_e$ is not processed if the value of the lock $LP_{Ke}$ is equal to "1"; it is not then possible to update a key for deciphering the control words.

the parameter $P_{TdA}$ containing data for modifying or registering a new entitlement to access a multimedia signal is not processed if the value of the lock $LP_{TdA}$ is equal to "1"; it is thus not possible to register or to update a subscription.

the use of the key $K_s$ to decipher the cryptogram of the key $K_e$ is not permitted for certain elementary functions and may be permitted for other elementary functions, the modification of the ceiling permitted for impulse buying, the registering of a new access entitlement or the registering or modifying of a cryptographic key are prohibited if the corresponding value of the lock $LF_i$ is equal to "1".

It will also be noted that the execution of the elementary function suitable for configuring the value of the locks may itself be prohibited if the value of the lock $LP_{config}$ or $LF_{config}$ is equal to "1". Thus, if the EMM message received contains the parameter $P_{config}$, and if the value of the lock $LP_{config}$ or $LF_{config}$ is equal to "1", then the modification of the value of the locks is prohibited so that the behaviour of the processor 42 is definitively frozen.

Step 102 is, for example, identical to step 100 with the exception that a deciphering of the EMMC message with the aid of the key $K_u$ is firstly carried out if such a deciphering is permitted, and that the list FIELDPIEMMC is used instead of the list FIELDPIEMM.

The fact of using two different lists FIELDPIEMM and FIELDPIEMMC makes it possible to obtain different behaviour of the processor 42 if the latter processes a non-confidential EMM message or an EMMC message.

During step 104, the restriction function is implemented in a similar manner to what was described in regard to step 100 with the exception of the fact that the message processed is an ECM message and that consequently the list FIELDPIECM is used instead of the list FIELDPIEMM.

Thus, it is possible to prevent the deciphering of the cryptogram CW* by altering the value of one or more of the following locks:
  a lock $LO_{CW}$ associated with the key $K_e$ and corresponding to the elementary function for deciphering the cryptogram of the control word,
  a lock $LE_{CW}$ of the list FIELDPIECM corresponding to the parameter CW*, or
  a lock $LF_{CW}$ of the list FIELDFCT corresponding to the elementary function for deciphering the cryptogram CW*.

This may be useful when it has been determined that the processor 42 is used in a fraudulent manner.

During step 104, it is also possible to prevent the comparison of particular access conditions contained in an ECM message received with the access entitlements stored in the security processor by altering the value of one of the following locks:
  a lock $LE_{AC}$ of the list FIELDPIECM corresponding to the parameter AC of a particular condition, or
  a lock $LF_{AC}$ of the list FIELDFCT corresponding to the elementary function of comparing the access conditions with access entitlement.

This may be useful for prohibiting the descrambling of certain multimedia signals by the receiver 8.

However, in the normal case, at the conclusion of phase 104, the control word is deciphered and then provided to the descrambler 48 which descrambles the multimedia signals received during a step 130.

The descrambled multimedia signals are thereafter displayed as plain text by the screen 50 during a step 132.

Judicious implementation of the method above, consists in dispatching in one and the same EMM message:
  a first parameter $P_{config}$ for toggling the value of a lock $LO_p$ or $LC_p$ or $LE_p$ or $LF_p$ to the value "0", immediately followed,
  by a parameter triggering an operation which cannot be completed successfully if the value of the lock modified by the first parameter $P_{config}$ has been toggled to "0", and immediately followed,
  by a second parameter $P_{config}$ making it possible to toggle the value of the lock modified by the first parameter $P_{config}$ in the reverse direction.

Thus, a particular operation of the processor 42 is permitted solely for a very short time span. Moreover, the security processor such as the processor 42 generally processes the parameters $P_i$ in their order of arrival and does not allow multitask processing of several parameters simultaneously. Under these conditions, the reception of the abovedescribed EMM message prevents exploitation of any security flaw in this particular operation. Specifically, before receiving this EMM message, the particular operation cannot be executed given that the value of the lock is equal to "1". Thereafter, when the value of the lock is toggled to "0" and given that the processor 42 executes this operation immediately after modifying the value of the lock, it is not possible to intercalate another processing intended to exploit the security flaw of this operation. Thereafter, immediately at the end of executing the operation, the value of the lock is again toggled to "1" so that it is no longer possible to trigger the execution of this operation which exhibits a security flaw. Under these conditions, it is possible to execute an operation exhibiting a security flaw without this security flaw being exploitable by a hacker.

Numerous other embodiments are possible. For example, the security processor 42 may be inserted into a detachable descrambling module in accordance with Standard EN 50 221. As a variant, the security processor is a hardware module rigidly integrated into the decoder or into the detachable descrambling module. Thus, this decoder or this detachable module forms, together with the security processor, just one and the same single rigid entity.

Finally, the security processor can also be a software module executed by the decoder or by the detachable module. In this latter case, the microprocessor of the security processor is the same as that used by the decoder or the detachable module to perform other functions such as descrambling.

As a variant, locks may also be associated with each access entitlement stored in the security processor in such a way as to permit and, alternately, to prohibit access to these access entitlements.

In another variant, a lock $LE_i$ set to the value "0" permits (step 110) the presence of the parameter $P_i$ concerned, with the proviso that the code 64 of the application innately permits it. The same holds for a lock $LP_i$, $LC_i$, $LO_i$ (step 118) or $LF_i$ (step 114). For example, in the case where the lists FIELDPIEMM, FIELDPIEMMC and FIELDPIECM have the same structure, certain parameters $P_i$ designated in FIELDPIEMM or FIELDPIEMMC, as the parameter for deciphering a control word, are innately prohibited in an EMM or EMMC message by the application itself. In another example, a functional version of a security processor can support the elementary function for registering new access entitlements while another functional version, designed to be discardable after accessing a single content, does not allow it.

The invention claimed is:
1. A security processor for a decoder for receiving a scrambled multimedia signal which is scrambled with a control word, the multimedia signal being broadcast by a network head, the security processor comprising:
  a microprocessor;
  a rewritable memory storing one or more first rewritable locks, each of the first rewritable locks having a value which toggles between a first predetermined value and a second predetermined value and at least one cryptographic key;
  a non-rewritable memory storing an application code which, when executed by the microprocessor, causes the microprocessor to execute a set of operations comprising: initializing the value of each of the first rewritable locks;
    receiving an EMM (Entitlement Management Message) configuration message from the network head wherein the EMM configuration message comprises at least one lock configuration parameter;
    configuring the value of at least one of the first rewriteable locks according to the at least one lock configuration parameter;

receiving a particular ECM (Entitlement Control Message) or EMM message dispatched by the network head in conjunction with the scrambled multimedia signal; and based on the value of each of the at least one of the first rewritable locks, a) permitting execution at the security processor of a particular corresponding operation of a set of operations of the security processor coded within the application code and executable by the microprocessor for processing ECM or EMM messages; or b) prohibiting execution of the particular corresponding operation at the security processor, and wherein the particular corresponding operation for each of the at least one of the first rewritable locks is chosen from a group of operations consisting of:

using a corresponding key of the at least one of cryptographic key recorded in the rewritable memory;

processing of a parameter contained in the particular EMM or ECM message; and executing of a first conditional access function coded within the application code and executable by the microprocessor, the first conditional access function being executed independently of other conditional access functions coded within the application code such that non-execution of the first conditional access function does not prevent execution, by the microprocessor, of any one of the other conditional access functions.

2. The security processor according to claim 1,
wherein the memory comprises at least one field FIELDKEY associated with a corresponding one of the at least one cryptographic key, the at least one field FIELDKEY containing several locks, each of the several locks corresponding to a respective conditional access function, and wherein the application code is further executable by the microprocessor to permit or prohibit use of the corresponding one of the at least one cryptographic key by the respective conditional access function for each of the several locks based on a value for the lock contained in the field FIELDKEY associated with the corresponding cryptographic key.

3. The security processor according to claim 1,
wherein the security processor contains a list chosen from one of the following lists:

a list FIELDPIEMM associated with non-confidential EMM messages, this list FIELDPIEMM containing several locks, each of the locks corresponding to a respective parameter Pi capable of being contained in a non-confidential EMM message, a list FIELDPIEMMC associated with confidential EMM messages, containing several locks, each of the locks corresponding to a respective parameter Pi capable of being contained in a confidential EMM message, and a list FIELDPIECM associated with the ECM messages, containing several locks, each of the locks corresponding to a respective parameter Pi capable of being contained in an ECM message, and wherein the application code is further executable by the microprocessor to, for each message received by the security processor associated with the list, permit or prohibit processing of a parameter Pi contained in the message received by the security processor as a function of a value of the lock corresponding to the parameter Pi in the list.

4. The security processor according to claim 1,
wherein the security processor comprises a list FIELDFCT associated with the conditional access functions, the list FIELDFCT containing several locks, each of the locks corresponding to a respective conditional access function, and wherein the application code is further executable by the microprocessor to, for each of the several locks contained within the list FIELDFCT, permit or prohibit execution of the respective conditional access function for the lock as a function of a value of the lock.

5. The security processor according to claim 1,
wherein the rewritable memory further stores one or more second rewritable locks each having a value that toggles between a first predetermined value and a second predetermined value in response to an EMM or ECM message, and wherein the application code is further executable by the microprocessor to, for each second rewritable lock, prohibit, based on the value of the second rewritable lock, a function chosen from a group of functions consisting of:

use of any cryptographic key necessary for toggling the value of at least one of the first or second rewritable locks, processing of any parameter contained in an EMM message suitable for toggling the value of at least one of the first or second rewritable locks, and execution of any conditional access function suitable for toggling the value of at least one of the first or second rewritable locks.

6. The security processor according to claim 1, wherein the first conditional access function is different from a function for writing new access entitlements and from a function for writing new cryptographic keys.

7. A method of configuring a behavior of a security processor for a decoder suitable for receiving a scrambled multimedia signal which is scrambled with a control word, the multimedia signal being broadcast by a network head, wherein the security processor comprises a microprocessor and a rewritable memory storing at least one cryptographic key and one or more first rewritable locks, each of the first rewritable locks having a value which toggles between a first predetermined value and a second predetermined value the method comprising:

initializing, by the security processor, the value of each of the first rewritable locks;

receiving, by the security processor, an EMM (Entitlement Management Message) configuration message from the network head wherein the EMM configuration message comprises at least one lock configuration parameter;

configuring, by the security processor, the value of at least one of the first rewritable locks according to the at least one lock configuration parameter;

receiving, by the security processor, a particular ECM (Entitlement Control Message) or EMM message dispatched by the network head in conjunction with the scrambled multimedia signal;

based on the value of each of the at least one of the first rewritable locks, a) permitting execution at the security processor of a particular corresponding operation of a set of operations of the security processor for processing ECM or EMM messages; or b) prohibiting, at the security processor, execution of the particular corresponding operation, wherein the particular corresponding operation for each of the at least one of the first rewritable locks is chosen from a group of operations consisting of:
    using a corresponding key of the at least one of cryptographic key recorded in the rewritable memory;
    processing of a parameter contained in the particular EMM or ECM message; and
    executing of a first conditional access function by the security processor, the first conditional access function being executed independently of other conditional access functions at the security processor such that non-execution of the first conditional access function does not prevent execution, by the security processor, of any one of the other conditional access functions.

8. The method according to claim 7, wherein the method further comprises:
    managing at least one field FIELDKEY stored in the rewritable memory and associated with a corresponding cryptographic key of the at least one cryptographic key, the at least one field FIELDKEY containing several locks, each of the several locks corresponding to a respective conditional access function, and
    permitting or prohibiting use of the corresponding cryptographic key by the respective conditional access function for each of the several locks as a function of a value of the lock which is contained in the field FIELDKEY associated with the corresponding cryptographic key.

9. The method according to claim 7, wherein the method further comprises:
    managing at least one list chosen from a group of lists consisting of:
        a list FIELDPIEMM associated with non-confidential EMM messages, containing several locks, each of the locks corresponding to a respective parameter Pi capable of being contained in a non-confidential EMM message,
        a list FIELDPIEMMC associated with confidential EMM messages, containing several locks, each of the locks corresponding to a respective parameter Pi capable of being contained in a confidential EMM message, and
        a list FIELDPIECM associated with the ECM messages, containing several locks, each of the locks corresponding to a respective parameter Pi capable of being contained in an ECM message, and
    permitting or prohibiting, for each message received by the security processor associated with the at least one list, processing of a parameter Pi contained in the message received by the security processor as a function of a value of the lock corresponding to the parameter Pi in the list associated with the received message.

10. The method according to claim 7, wherein the method further comprises:
    managing a list FIELDFCT stored in the rewritable memory and associated with the conditional access functions, the list FIELDFCT containing several locks, each of the locks corresponding to a respective conditional access function, and
    permitting or prohibiting for each of the several locks contained within the list FIELDFCT, execution of the respective conditional access function for the lock as a function of a value of the lock.

11. The method according to claim 7, wherein the method further comprises:
    receiving a particular EMM message including:
        a first parameter triggering a toggling of the value of a first lock of the at least one first rewritable lock so as to permit execution of the particular corresponding operation for the first lock at the security processor,
        a second parameter triggering an execution of the particular corresponding operation for the first lock, and
        a third parameter triggering a toggling of the value of the first lock so as to prohibit execution of the particular operation for the first lock, and processing in order by the security processor of the first, second and third parameters.

12. The method according to claim 7, wherein the first conditional access function is different from a function for writing new access entitlements and from a function for writing new cryptographic keys.

13. A non-transitory medium for recording information containing instructions that, when these instructions are executed by a microprocessor of a security processor, cause the security processor to perform a method of configuring a behavior of the security processor for a decoder for receiving a scrambled multimedia signal which is scrambled with a control word, the multimedia signal being broadcast by a network head, wherein the security processor comprises the microprocessor and a rewritable memory storing one or more first rewritable locks and at least one cryptographic key, each of the first rewritable locks having a value which toggles between a first predetermined value and a second predetermined value, the method comprising:
    initializing the value of each of the first rewritable locks;
    receiving an EMM (Entitlement Management Message) configuration message from the network head wherein the EMM configuration message comprises at least one lock configuration parameter;
    configuring the value of at least one of the first rewritable locks according to the at least one lock configuration parameter;
    receiving a particular ECM (Entitlement Control Message) or EMM message dispatched by the network head in conjunction with the scrambled multimedia signal;
    based on the value of each of the at least one of the first rewritable locks, a) permitting execution at the security processor, of a particular corresponding operation of a set of operations of the security processor for processing the ECM or the EMM messages; or b) prohibiting, at the security processor, execution of the particular corresponding operation, and
    wherein the particular corresponding operation for each of the at least one of the first rewritable locks is chosen from a group of operations consisting of:
        using a corresponding key of the at least one cryptographic key recorded in the rewritable memory;
        processing of a parameter contained in the particular EMM or ECM message; and
        executing of a first conditional access function at the security processor, the first conditional access function being executed independently of other conditional access functions at the security processor so that non-execution of the first conditional access function does not prevent execution, at the security processor, of any one of the other conditional access functions.

* * * * *